United States Patent [19]
Thibaut et al.

[11] Patent Number: 5,597,857
[45] Date of Patent: Jan. 28, 1997

[54] LOW-DUST GRANULES OF PLASTIC ADDITIVES

[75] Inventors: Daniel Thibaut, Michelbach-Le-Bas, France; Benjamin Breitenstein, Rheinfelden, Switzerland; Linda Kirchberger, Franklin Lakes, N.J.

[73] Assignee: Ciba-Geigy Corporation, Tarrytown, N.Y.

[21] Appl. No.: 420,388

[22] Filed: Apr. 12, 1995

Related U.S. Application Data

[63] Continuation-in-part of Ser. No. 365,262, Dec. 28, 1994, abandoned.

[51] Int. Cl.⁶ .............................. C08K 5/09; C09K 15/32
[52] U.S. Cl. ................. 524/400; 252/400.1; 252/400.23; 252/400.24; 252/401
[58] Field of Search ........................ 252/400.1; 524/400

[56] References Cited

U.S. PATENT DOCUMENTS

| | | | |
|---|---|---|---|
| 4,238,384 | 12/1980 | Blumberg et al. | 260/37 |
| 4,442,017 | 4/1984 | Blumberg et al. | 252/301.21 |
| 4,889,878 | 12/1989 | Dixon et al. | 523/200 |
| 4,957,956 | 9/1990 | Neri et al. | 524/120 |
| 5,017,628 | 5/1991 | Dietlein | 523/200 |
| 5,240,642 | 8/1993 | Neri et al. | 252/399 |

FOREIGN PATENT DOCUMENTS

| | | |
|---|---|---|
| 0565184A | 10/1993 | European Pat. Off. . |
| 618314 | 10/1994 | European Pat. Off. . |

*Primary Examiner*—Kriellion S. Morgan
*Attorney, Agent, or Firm*—Michele A. Kovaleski

[57] ABSTRACT

Low-dust granules of plastic additives, comprising at least 10% by weight of calcium stearate, where the water content of the calcium stearate is less than 2%, having a particle size distribution, in accordance with ISO 3435, of from 1 mm to 10 mm, a loose bulk density of greater than 400 g/l and a flowability in accordance with DIN 53492 of less than 15 s (tR25), a process for their production, and the use of these granules for the stabilization of organic polymers.

29 Claims, No Drawings

LOW-DUST GRANULES OF PLASTIC ADDITIVES

This is a continuation-in-part of application Ser. No. 08/365,262 filed Dec. 28, 1994, now abandoned.

The present invention relates to low-dust granules of plastic additives which contain calcium stearate, to a process for the production of these granules, and to the use of these granules for the stabilization of plastics.

Organic polymers (plastics), in particular polyolefins, generally require the addition of additives in order to be processed and in order to retain the service properties for a long period. Damaging influences for organic polymers, besides light and heat, are also residues of the catalysts used for the preparation. The prior art discloses a very wide variety of substance classes which can be used as additives and stabilizers. Due to the variety of processes, not all of which are understood in detail, for damage to organic polymers, mixtures of a plurality of additives are frequently employed.

In general, the additives are in powder form. However, additive mixtures in powder form have a number of disadvantages, such as dusting, even as far as dust explosion, tendency toward separation and also metering difficulties. For this reason, there is a demand for commercial forms which do not have these disadvantages. To this end, for example, agglomeration processes (aqueous and if appropriate using a disperser), mixing processes with binders or compacting using a pellet press are described. In most cases, however, the resultant commercial forms still do not have adequate mechanical properties. The commercial forms frequently also contain water or other binders, which can cause problems during subsequent incorporation to an organic polymer or requires particular measures. There is therefore a desire for granular additive mixtures with a long shelf life which contain no binders. A granular material of this type which also satisfies the increasingly important ecological aspect (low dust, material saving by omitting the binder) is also desirable.

To this end, U.S. Pat. No. 5,240,642 describes a process for obtaining granular forms of organic acid and inorganic antiacid additives and tetrakis[3-(3,5-di-tert-butyl-4-hydroxyphenyl)-propionyloxymethyl]methane, which process is carried out in the presence of the latter material in the molten state, homogeneously distributing said material throughout the antiacid powder mass, extruding the mass, cooling the extruded strands and subsequently forming granules. Unfortunately, the granules obtained by said process are characterized by several deficiencies, namely these granules still emit an appreciable amount of dust, which is particularly harmful to workers in the industry working on large-scale processes; have a tendency to separate during storage and transport; and have metering difficulties associated therewith.

Surprisingly, granules of plastic additives which satisfy the requirements of industry to a large extent are obtained in accordance with the instant invention by warming a mixture of plastic additives and calcium stearate until at least 80% of the calcium stearate component has melted, and carrying out the subsequent molding in the plastic state.

The novel granules of plastic additives are very uniform and are distinguished by excellent bulk material properties, in particular freedom from dust, flowability and abrasion resistance, and by a good shelf life. They can be metered very well into the organic polymers to be stabilized and have a thermally better melting behavior than conventional calcium stearates or calcium stearate powder mixtures.

The invention accordingly relates, in addition to the process described in greater detail below, to low-dust granules of plastic additives comprising at least 10% by weight of calcium stearate, where the water content of the calcium stearate is less than 2%, having a particle size distribution, in accordance with ISO 3435, of from 1 mm to 10 mm, a loose bulk density of greater than 400 g/l and a flowability in accordance with DIN 53492 of less than 15 s (tR25).

For the purposes of the present invention, the term "low-dust granules" is taken to mean granules whose dust emission in the Heubach test is less than 0.15% by weight (after 5 minutes).

In the remainder of the description, the term "novel granules" is taken to mean the low-dust granules defined as above.

For the purposes of this invention, calcium stearate is taken to mean a product of the reaction of commercially available fatty acid mixtures and a calcium compound. Commercially available fatty acid mixtures comprise a mixture of $C_{14}$–$C_{20}$ fatty acids with a predominant content of stearic acid and frequently also palmitic acid; for example about 67% of stearic acid and 33% of palmitic acid. In accordance with the invention, the calcium stearate has a low content of water of crystallization, ie. it is substantially amorphous. Depending on environmental influences (for example storage conditions) and the thermal history, the total water content of calcium stearate or the calcium stearate component can vary, but is preferably less than 1%.

In a preferred embodiment, the novel granules comprise at least 20% by weight, and particularly preferably at least 30% by weight or 100% by weight, of calcium stearate.

The particle size distribution of the novel granules, defined in accordance with ISO 3435, is preferably from 1 mm to 6 mm, particularly preferably from 2 mm to 6 mm.

The loose bulk density is preferably greater than 500 g/l, but it depends on the density of the overall mixture and can be higher or lower in mixtures whose density differs greatly from that of calcium stearate. The stated values therefore relate to mixtures in which the density is no more than 10% different from that of calcium stearate. If the density of the mixture differs by a greater amount, the bulk density should be corrected by a factor given by the ratio between the density of calcium stearate and the density of the mixture.

In accordance with the invention, the flowability, determined in accordance with DIN 53492, is preferably less than 15 s (tR15), most preferably less than 10 s (tR15).

The dust emission is determined by the Heubach test in an experimental set-up similar to practical conditions, where the test material is kept in motion in order to determine the dusting tendency due to abrasion. The apparatus used is produced by Heubach Engineering GmbH, Langelsheim, DE. In detail, the test material (sample weight 50 g) is moved at 30 rpm (corresponding to a peripheral speed of 19 cm/sec) for 5 minutes in a dust formation unit with a capacity of 2.5 l in which three chicanes are arranged in the rotation direction at an angle of 45° to the housing wall, while a 0.32 l/sec stream of air deposits the fine component on a filter. In accordance with the invention, the fine content determined in this way preferably does not exceed 0.1% by weight.

The other plastic additives which may be present according to the invention in the granules are known per se, either alone or in various combinations. Many of the plastic additives described below are commercially available. The other plastic additives can be prepared by known processes and under standard conditions, are in the form of solids (for example powders or granules), melts (for example directly from the synthesis) or liquids.

The present invention furthermore relates to a process for the production of granules of plastic additives, which comprises warming a mixture of plastic additives comprising at least 10 and up to 100% by weight of calcium stearate until at least 80% by weight of the calcium stearate component has melted, forcing the mixture through a plate provided with nozzles or holes, where the nozzle or hole diameter is from 1 to 10 mm, and chopping the resultant extrudate in the plastic state to give granules. The term "plastic state" refers to the strands which are not yet solidified; the strands are in the non-rigid state; and with regard to the viscosity, the strands have in general a viscosity in the range from 1 to 500000 Pa·s, preferably from 1 to 100000 Pa.s.

The nozzle or hole diameter is preferably from 2 to 6 mm.

The plastic additives (or calcium stearate) are advantageously melted in a single- or twin-screw extruder; such extruders are known in the plastics-processing industry and are marketed, for example, by Buss (CH), Brabender (DE), Werner und Pfleiderer (DE) or Bühler (CH). Plastic additives here are generally employed as solids (for example powders or granules), but it is also possible to employ melts, aqueous suspensions or, in minor amounts, liquid additives. After or alternatively during the chopping of the extrudates, which takes place in the still-soft state, and after passage through a nozzle or perforated disk, the granule particles are cooled. Cooling can be carried out in the form of wet cooling with water (for example in water, by a water film, water ring, etc) or preferably by means of air (for example an air film, air vortex, etc) or by combination. If water cooling is used, subsequent dewatering and drying (preferably in a fluidized-bed drier) is necessary. These cooling methods are known in their industrial implementations. It is essential that the granulation takes place in the plastic state before the actual cooling step, in contrast to the extrusion granulation and grinding processes conventional in industry.

The preparation of the calcium stearate-containing melt is usually not carded out at a single constant temperature, but instead the material passes through a temperature profile in a continuous process. A peak temperature of above 130° C. is expediently achieved here; peak temperatures of above 150° C. being preferred, depending on the other mixture components, and peak temperatures of up to 220° C. generally being suitable. These temperatures relate to the temperature of the material.

Preference is furthermore given to a process which additionally includes degassing. When the process is carried out, this degassing facility is preferably installed in a zone in which the calcium stearate is melted or in a subsequent zone.

The granules are preferably produced using an extruder, a material temperature of above 130° C. being achieved at at least one point within the extruder.

The plastic additive granules obtained by the present process are likewise a subject-matter of the present invention. The preferences described apply analogously here.

The other plastic additives which may be present in the granules according to the invention are preferably compounds selected from the group consisting of sterically hindered amines (HALS), sterically hindered phenols, phosphites or phosphonites, hydrotalcites, metal oxides, metal carbonates, further metal soaps, antistatics, antiblocking agents, flameproofing agents, thioesters, internal and external lubricants, pigments, UV absorbers and further light stabilizers.

The granules can furthermore also contain additional substances, such as, for example, thermoplastic polymers (for example polyolefins or polyolefin waxes).

A particularly preferred embodiment of the invention is the combination of calcium stearate with at least one antioxidant of the sterically hindered phenol type and at least one phosphite or phosphonite. Particular preference is furthermore given to the combination of calcium stearate with at least one compound from the group consisting of sterically hindered amines containing at least one 2,2,6,6-tetramethylpiperidine radical.

A very particularly preferred embodiment of the invention is the combination of calcium stearate with at least one antioxidant of the sterically hindered phenol type and at least one phosphite or phosphonite and at least one compound from the group consisting of sterically hindered amines containing at least one 2,2,6,6-tetramethylpiperidine radical.

The sterically hindered amines, preferably piperidine compounds, are principally known as light stabilizers. These compounds contain one or more groups of the formula I

These can be compounds of relatively low molecular weight (<700) or of relatively high molecular weight. In the latter case, they can also be oligomeric or polymeric products.

Particularly important stabilizers are the following classes of tetramethylpiperidine compounds.

a) Compounds of the formula II

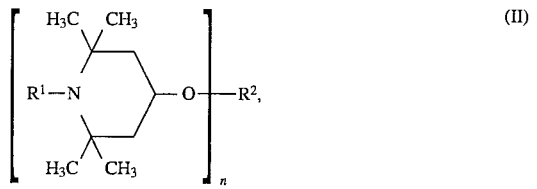

in which n is a number from 1 to 4, preferably 1 or 2

$R^1$ is hydrogen, oxyl, $C_1$–$C_{12}$alkyl, $C_3$–$C_8$alkenyl, $C_3$–$C_8$alkynyl, $C_7$–$C_{12}$aralkyl, $C_1$–$C_8$alkanoyl, $C_3$–$C_5$alkenoyl, glycidyl or a —$CH_2CH(OH)$—Z group, in which Z is hydrogen, methyl or phenyl, $R^1$ preferably being $C_1$–$C_4$alkyl, allyl, benzyl, acetyl or acryloyl and $R^2$, if n is 1, is hydrogen, $C_1$–$C_{18}$alkyl which is uninterrupted or interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, a cycloaliphatic carboxylic acid having 7 to 15 carbon atoms, an α,β-unsaturated carboxylic acid having 3 to 5 carbon atoms or an aromatic carboxylic acid having 7 to 15 carbon atoms; if n is 2, $R^2$ is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, a cycloaliphatic or aromatic dicarboxylic acid having 8–14 carbon atoms or an aliphatic, cycloaliphatic or aromatic dicarbamic acid having 8–14 carbon atoms; if n is 3, $R^2$ is a trivalent radical of an aliphatic, cycloaliphatic or aromatic tricarboxylic acid, an aromatic tricarbamic acid or a phosphorus-containing acid or a trivalent silyl radical, and, if n is 4, $R^2$ is a tetravalent radical of an aliphatic, cycloaliphatic or aromatic tetracarboxylic acid.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$–$C_{18}$alkyl $R^2$ can be, for example, the groups mentioned above and in addition, for example, n-tridecyl, n-tetradecyl, n-hexadecyl or n-octadecyl.

$C_3$–$C_8$alkenyl $R^1$ can be, for example, 1-propenyl, allyl, methallyl, 2-butenyl, 2-pentenyl, 2-hexenyl, 2-octenyl or 4-tert-butyl-2-butenyl.

$C_3$–$C_8$alkynyl $R^1$ is preferably propargyl.

$C_7$–$C_{12}$aralkyl $R^1$ is, in particular, phenethyl and especially benzyl.

$C_1$–$C_8$alkanoyl $R^1$ is, for example, formyl, propionyl, butyryl, octanoyl, but preferably acetyl, and $C_3$–$C_5$alkenoyl $R^1$ is, in particular, acryloyl.

If $R^2$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If $R^2$ is a divalent radical of a dicarboxylic acid, it is, for example, a malonyl, succinyl, glutaryl, adipoyl, suberoyl, sebacoyl, maleoyl, phthaloyl, dibutylmalonyl, dibenzylmalonyl, butyl(3,5-di-tert-butyl-4-hydroxybenzyl)malonyl or bicycloheptenedicarbonyl radical.

If $R^2$ is a trivalent radical of a tricarboxylic acid, it is, for example, a trimellityl or nitrilotriacetyl radical.

If $R^2$ is a tetravalent radical of a tetracarboxylic acid, it is, for example, the tetravalent radical of butane-1,2,3,4-tetracarboxylic acid or of pyromellitic acid.

If $R^2$ is a divalent radical of a dicarbamic acid, it is, for example, a hexamethylenedicarbamoyl or 2,4-tolylenedicarbamoyl radical.

Examples of polyalkylpiperidine compounds from this class are the following compounds:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-tert-butyl-4-hydroxyphenyl)propionate
9) di(1-benzyl-2,2,6,6-tetramethylpiperidin-4-yl) maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethylpiperidin-4-yl) sebacate
16) di(1-allyl-2,2,6,6-tetramethylpiperidin-4-yl) phthalate
17) 1-propargyl-4-β-cyanoethyloxy-2,2,6,6-tetramethylpiperidine
18) 1-acetyl-2,2,6,6-tetramethylpiperidin-4-yl acetate
19) tri(2,2,6,6-tetramethylpiperidin-4-yl) trimellitate
20) 1-acryloyl-4-benzyloxy-2,2,6,6-tetramethylpiperidine
21) di(2,2,6,6-tetramethylpiperidin-4-yl) diethylmalonate
22) di(1,2,2,6,6-pentamethylpiperidin-4-yl) dibutylmalonate
23) di(1,2,2,6,6-pentamethylpiperidin-4-yl) butyl(3,5-diten-butyl-4-hydroxybenzyl)malonate
24) di(1,2,2,6,6-pentamethylpiperidin-4-yl) dibenzylmalonate
25) di(1,2,3,6-tetramethyl-2,6-diethylpiperidin-4-yl) dibenzylmalonate
26) hexane-1',6'-bis(4-carbamoyloxy-1-n-butyl-2,2,6,6-tetramethylpiperidine)
27) toluene-2',4'-bis(4-carbamoyloxy-1-n-propyl-2,2,6,6-tetramethylpiperidine)
28) dimethylbis(2,2,6,6-tetramethylpiperidin-4-oxy)silane
29) phenyltris(2,2,6,6-tetramethylpiperidin-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) phenyl bis-(1,2,6,6-pentamethylpiperidin-4-yl) phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine b) Compounds of the formula (III)

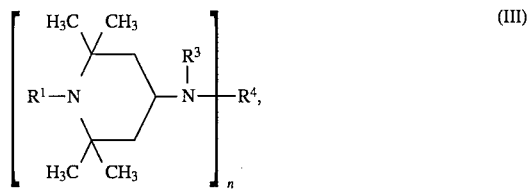

in which n is the number 1 or 2, $R^1$ is as defined under a), $R^3$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl or benzoyl and $R^4$, if n is 1, is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, glycidyl, a group of the formula —$CH_2$—CH(OH)—Z or of the formula —CONH—Z, in which Z is hydrogen, methyl or phenyl;

if n is 2, $R^4$ is $C_2$–$C_{12}$alkylene, $C_6$–$C_{12}$arylene, xylylene, a —$CH_2$—CH(OH)—$CH_2$— group or a —$CH_2$—CH(OH)—$CH_2$—O—D—O— group, in which D is $C_2$–$C_{10}$alkylene, $C_6$–$C_{15}$arylene or $C_6$–$C_{12}$cycloalkylene, or, with the proviso that $R^3$ is alkanoyl, alkenoyl or benzoyl, $R^4$ can alternatively be a divalent radical of an aliphatic, cycloaliphatic or aromatic dicarboxylic acid or dicarbamic acid or alternatively the group —CO—, or $R^3$ and $R^4$ together, if n 1, can be the divalent radical of an aliphatic, cycloaliphatic or aromatic 1,2- or 1,3-dicarboxylic acid.

Any $C_1$–$C_{12}$- or $C_1$–$C_{18}$-alkyl substituents are as defined above under a).

Any $C_5$–$C_7$cycloalkyl substituents are, in particular, cyclohexyl.

$C_7$–$C_8$aralkyl $R^3$ is, in particular, phenylethyl or especially benzyl. $C_2$–$C_5$Hydroxyalkyl $R^3$ is, in particular, 2-hydroxyethyl or 2-hydroxypropyl.

$C_2$–$C_{18}$alkanoyl $R^3$ is, for example, propionyl, butyryl, octanoyl, dodecanoyl, hexadecanoyl, octadecanoyl, but preferably acetyl, and $C_3$–$C_5$alkenoyl $R^3$ is, in particular, acryloyl.

$C_2$–$C_8$alkenyl $R^4$ is, for example, allyl, methallyl, 2-butenyl, 2-pentenyl, 2-hexenyl or 2-octenyl.

Hydroxyl-, cyano-, alkoxycarbonyl- or carbamide-substituted $C_1$–$C_4$alkyl $R^4$ can be, for example, 2-Hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene substituents are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

$C_6$–$C_{12}$cycloalkylene D is, in particular, cyclohexylene.

Examples of polyalkylpiperidine compounds from this class are the following compounds:

37) N,N'-bis(2,2,6,6-tetramethylpiperidin-4-yl)-hexamethylene-1,6-diamine
38) N,N'-bis(2,2,6,6-tetramethylpiperidin-4-yl)-hexamethylene-1,6-diacetamide
39) 1-acetyl-4-(N-cyclohexylacetamido)-2,2,6,6-tetramethylpiperidine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)succinamide
45) di(2,2,6,6-tetramethylpiperidin-4-yl) N-(2,2,6,6-tetramethylpiperidin-4-yl)-β-aminodipropionate
46) the compound of the formula

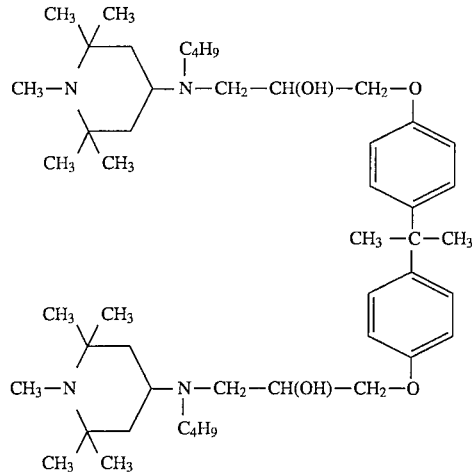

47) 4-(bis-2-hydroxyethylamino)-1,2,2,6,6-pentamethylpiperidine
48) 4-(3-methyl-4-hydroxy-5-tert-butylbenzamido)-2,2,6,6-tetramethylpiperidine
49) 4-methacrylamido-1,2,2,6,6-pentamethylpiperidine c) Compounds of the formula (IV)

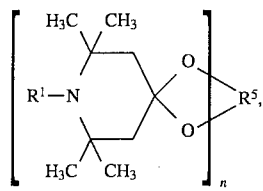 (IV)

in which n is the number 1 or 2, $R^1$ is as defined under a), and $R^5$, if n is 1, is $C_2$–$C_8$alkylene, $C_2$–$C_8$hydroxyalkylene or $C_4$–$C_{22}$acyloxyalkylene, and, if n is 2, $R^5$ is the (—$CH_2$)$_2$C(CH$_2$—)$_2$ group.

$C_2$–$C_8$Alkylene or -hydroxyalkylene $R^5$ is, for example, ethylene, 1-methylethylene, propylene, 2-ethylpropylene or 2-ethyl-2-hydroxymethylpropylene.

$C_4$–$C_{22}$Acyloxyalkylene $R^5$ is, for example, 2-ethyl-2-acetoxymethylpropylene.

Examples of polyalkylpiperidine compounds in this class are the following compounds:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]undecane
55) 2,2,6,6-tetramethylpiperidine-4-spiro-2'-(1',3'-dioxane)-5'-spiro-5"-(1",3"-dioxane)-2"-spiro-4"'-(2"',2"',6"',6"'-tetramethylpiperidine).

d) Compounds of the formulae VA, VB and VC

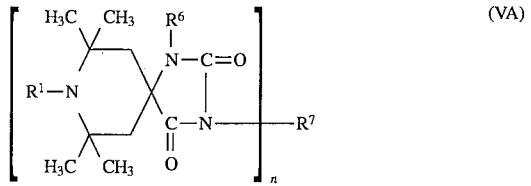 (VA)

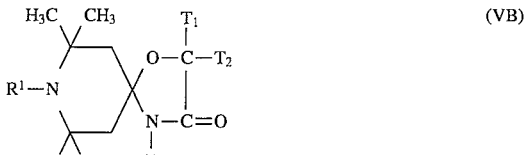 (VB)

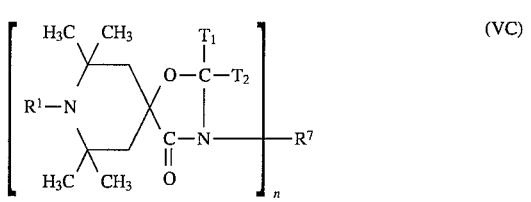 (VC)

in which n is the number 1 or 2, $R^1$ is as defined under a), $R^6$ is hydrogen, $C_1$–$C_{12}$alkyl, allyl, benzyl, glycidyl or $C_2$–$C_6$alkoxyalkyl, and $R^7$, if n is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —($CH_2$)p—COO—Q or of the formula —($CH_2$)p—O—CO—Q, in which p is 1 or 2 and Q is $C_1$–$C_4$alkyl or phenyl;

if n is 2, $R^7$ is $C_2$–$C_{12}$alkylene, $C_4$–$C_{12}$alkenylene, $C_6$–$C_{12}$arylene, a —$CH_2$—CH(OH)—$CH_2$—O—D—O—$CH_2$—CH(OH)—$CH_2$— group, in which D is $C_2$–$C_{10}$alkylene, $C_6$–$C_{15}$arylene, $C_6$–$C_{12}$cycloalkylene or a —$CH_2$CH(OZ')$CH_2$—(O$CH_2$—CH(OZ')$CH_2$)$_2$— group, in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$, together with the carbon atom bonding them, form a $C_5$–$C_{12}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents can be, for example, the groups mentioned above and in addition, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $R^7$ is, for example, 1-propenyl, allyl, methallyl, 2-butenyl or 2-pentenyl.

$C_7$–$C_9$aralkyl $R^7$, $T_1$ and $T_2$ are, in particular, phenethyl or especially benzyl. If $T_1$ and $T_2$, together with the carbon atom, form a cycloalkane ring, this can be, for example, a cyclopentane, cyclohexane, cyclooctane or cyclododecane ring.

$C_2$–$C_4$hydroxyalkyl $R^7$ is, for example, 2-hydroxyethyl, 2-hydroxypropyl, 2-hydroxybutyl or 4-hydroxybutyl.

$C_6$–$C_{10}$aryl $R^7$ $T_1$ and $T_2$ are, in particular, phenyl, α- or β-naphthyl, which are unsubstituted or substituted by halogen or $C_1$–$C_4$alkyl.

Examples of polyalkylpiperidine compounds from this class are the following compounds:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]-heneicosane
64) 2-butyl-7,7,9,9-tetramethyl-1-oxa-4,8-diaza-3-oxospiro[4,5]decane
65) 8-acetyl-3-dodecyl-1,3,8-triaza-7,7,9,9-tetramethylspiro[4,5]decane-2,4-dione or the compounds of the following formulae:

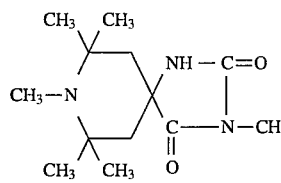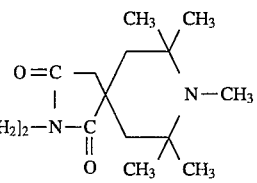

66)

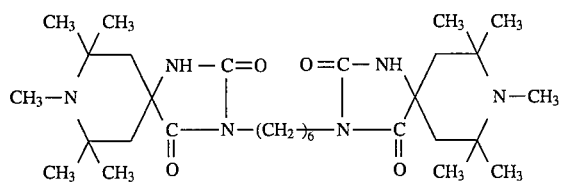

67)

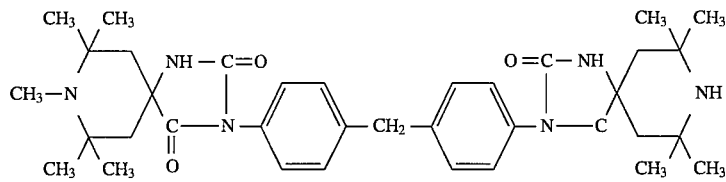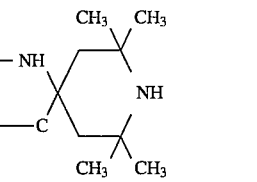

68)

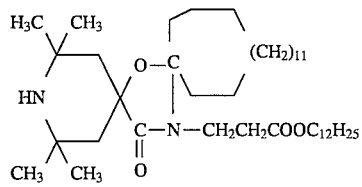

69)

$C_2$–$C_{12}$alkylene $R^7$ is, for example, ethylene, propylene, 2,2-dimethylpropylene, tetramethylene, hexamethylene, octamethylene, decamethylene or dodecamethylene.

$C_4$–$C_{12}$alkenylene $R^7$ is, in particular, 2-butenylene, 2-pentenylene or 3-hexenylene.

$C_6$–$C_{12}$arylene $R^7$ is, for example, o-, m- or p-phenylene, 1,4-naphthylene or 4,4'-biphenylene.

$C_2$–$C_{12}$alkanoyl Z' is, for example, propionyl, butyryl, octanoyl, dodecanoyl, preferably acetyl.

$C_2$–$C_{10}$alkylene, $C_6$–$C_{15}$arylene or $C_6$–$C_{12}$cycloalkylene D is defined as under b).

e) Compounds of the formula VI

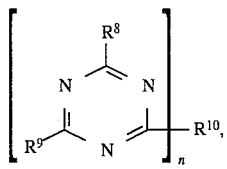

(VI)

in which n is the number 1 or 2 and $R^8$ is a group of the formula

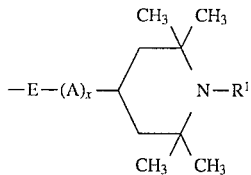

in which
$R^1$ is as defined under a),
E is —O— or —$NR^{11}$—,
A is $C_2$–$C_6$alkylene or —$(CH_2)_3$—O— and
x is the numbers [sic] 0 or 1,
$R^9$ is identical to $R^8$ or is one of the groups —$NR^{11}R^{12}$, —$OR^{13}$, —$NHCH_2OR^{13}$ and —$N(CH_2OR_{13})_2$,
$R^{10}$, if n=1, is identical to $R^8$ or $R^9$, and if n=2, is a —E—B—E— group, in which B is $C_2$–$C_6$alkylene, which is uninterrupted or interrupted by —$N(R^{11})$—,
$R^{11}$ is $C_1$–$C_{12}$alkyl, cyclohexyl, benzyl or $C_1$–$C_4$hydroxyalkyl or a group of the formula

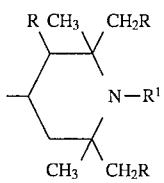

$R^{12}$ is $C_1$–$C_{12}$alkyl, cyclohexyl, benzyl or $C_1$–$C_4$hydroxyalkyl, and
$R^{13}$ is hydrogen, $C_1$–$C_{12}$alkyl or phenyl, or
$R^{11}$ and $R^{12}$ together are $C_4$–$C_5$alkylene or -oxaalkylene, for example

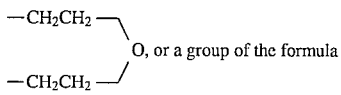

O, or a group of the formula

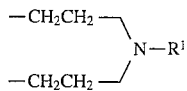

or alternatively $R^{11}$ and $R^{12}$ are in each case a group of the formula

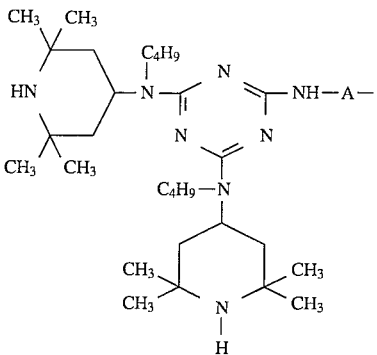

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents are, for example, 2-hydroxyethyl, 2-hydroxypropyl, 3-hydroxypropyl, 2-hydroxybutyl or 4-hydroxybutyl.

$C_2$–$C_6$akylene A is, for example, ethylene, propylene, 2,2-dimethylpropylene, tetramethylene or hexamethylene.

$R^{11}$ and $R^{12}$ together as $C_4$–$C_5$alkylene or -oxaalkylene are, for example, tetramethylene, pentamethylene or 3-oxapentamethylene.

Examples of polyalkylpiperidine compounds from this class are the compounds of the following formulae:

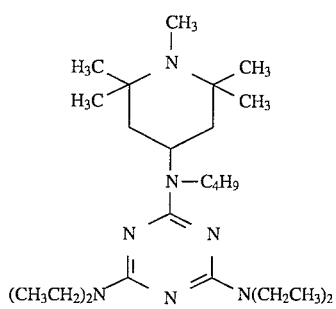

70)

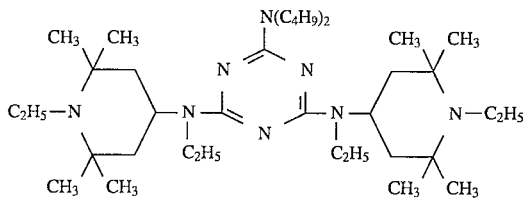

71)

72)
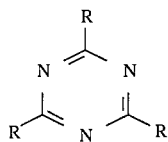
where R = 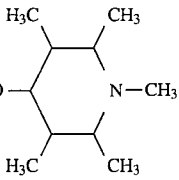
73)
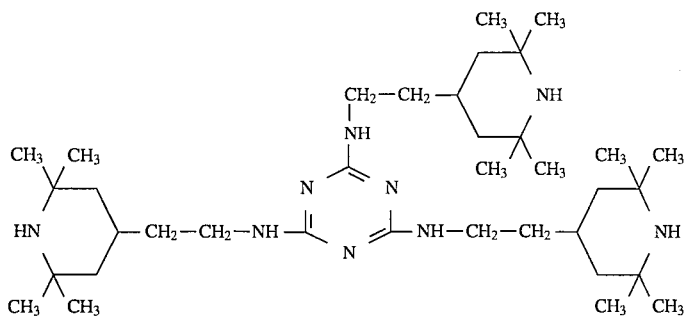
74)
75)
R—NH—(CH₂)₃—N(R)—(CH₂)₂—N(R)—(CH₂)₃—NH—R
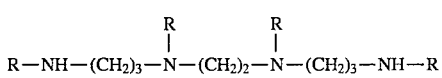
where R = 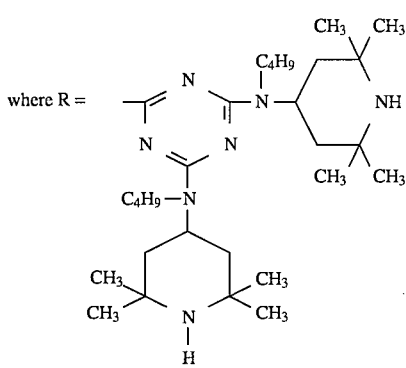
76)
R—NH—(CH₂)₃—N(R)—(CH₂)₂—N(R)—(CH₂)₃—NH—R

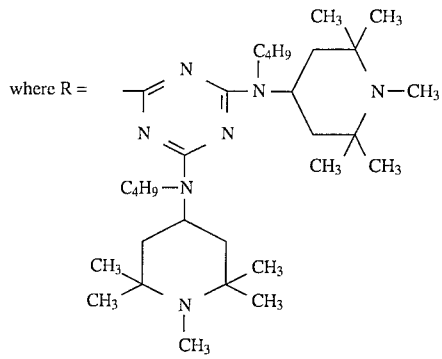
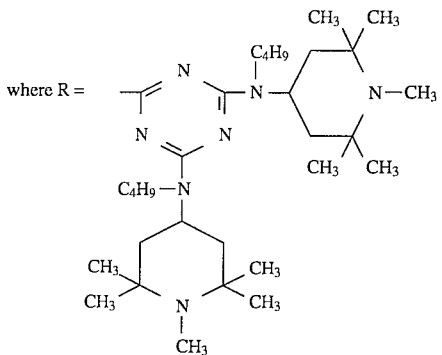
77)
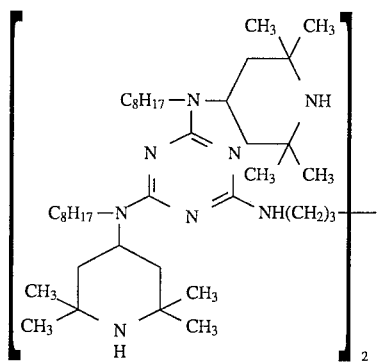
78)
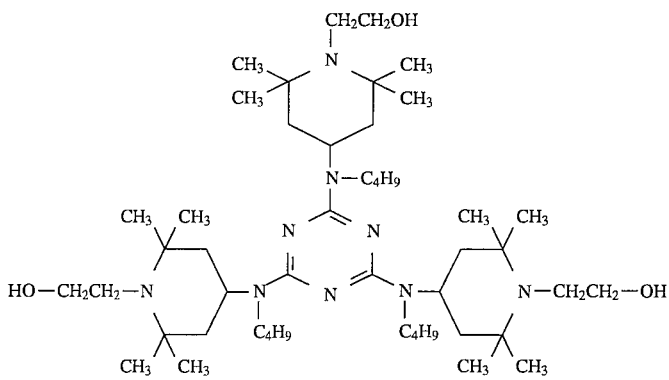
79)

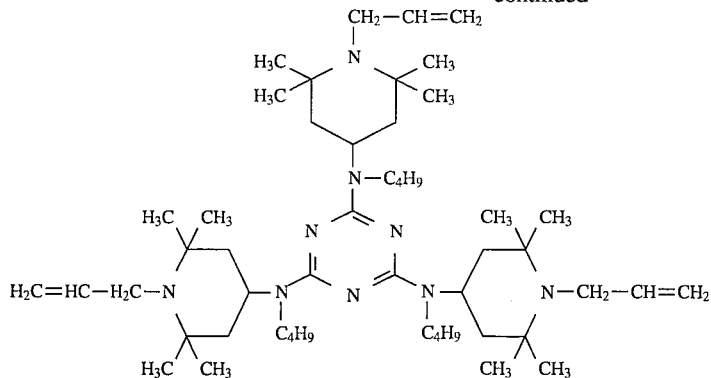
80)

f) Oligomeric or polymeric compounds whose recurring structural unit contains one or more 2,2,6,6-tetraalkylpipefidine radicals of the formula (I), in particular polyesters, polyethers, polyamides, polyamines, polyurethanes, polyureas, polyaminotriazines, poly(meth)acrylates, polysiloxanes, poly(meth)acrylamides and copolymers thereof containing such radicals.

Examples of 2,2,6,6-polyalkylpiperidine light stabilizers from this class are the compounds of the following formulae, where m is a number from 2 to about 200.

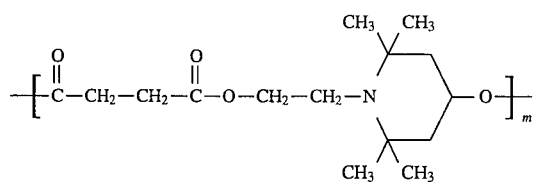
81)

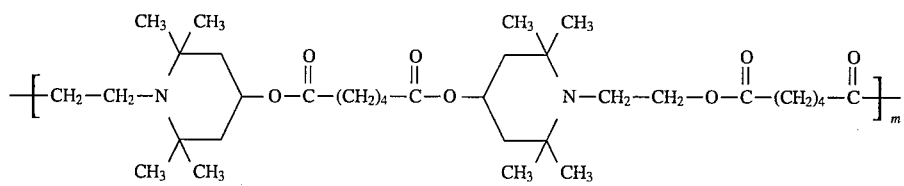
82)

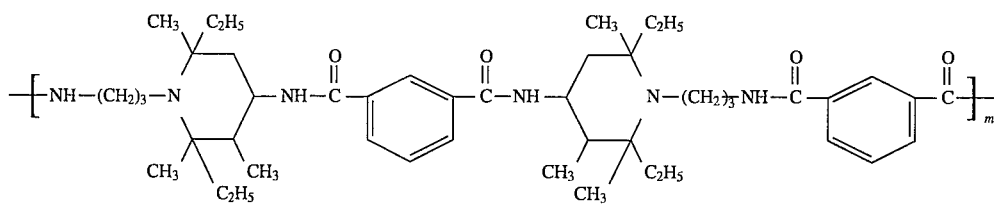
83)

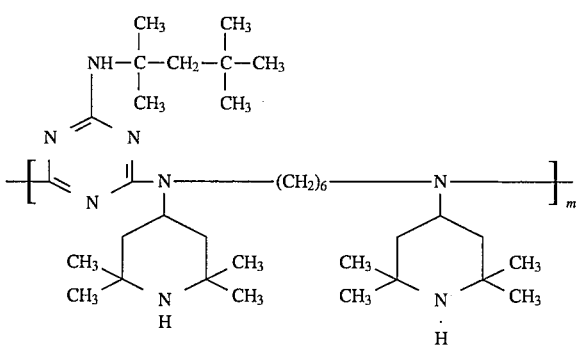
84)

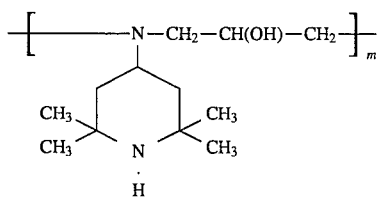
85)

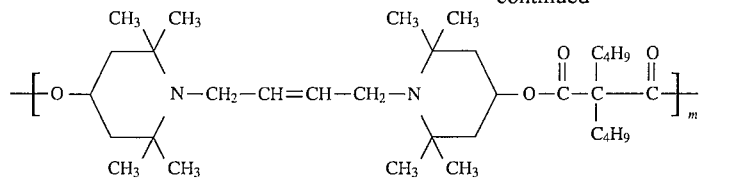 86)
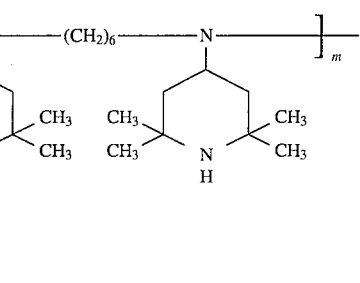 87)
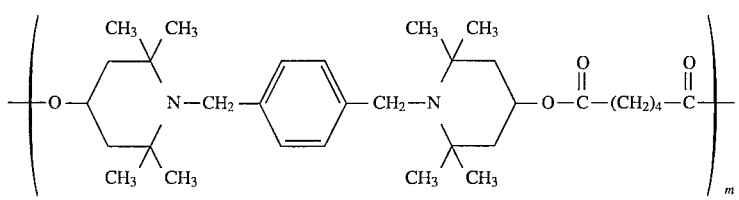 88)
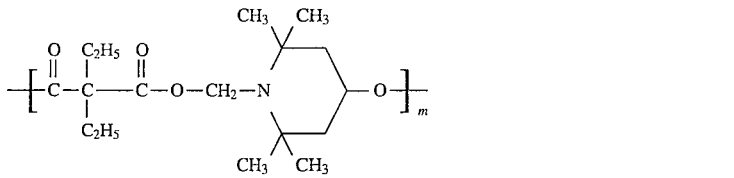 89)
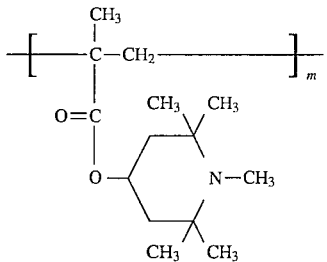 90)
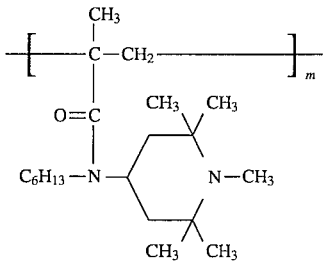 91)

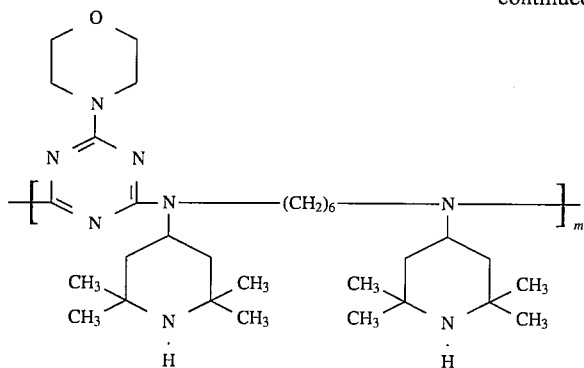
92)
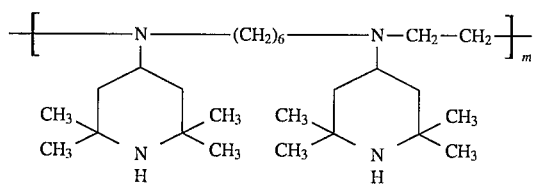
93)
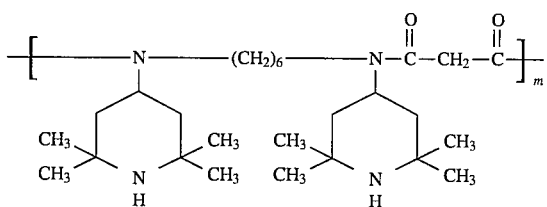
94)
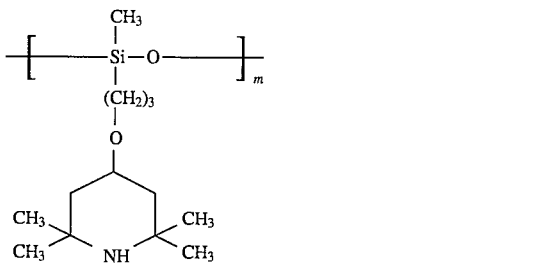
95)
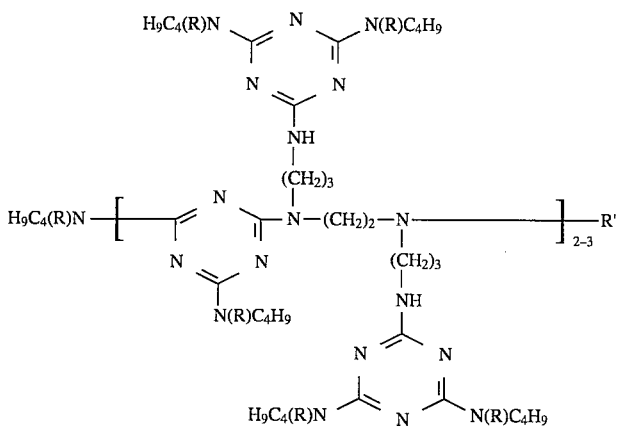
96)
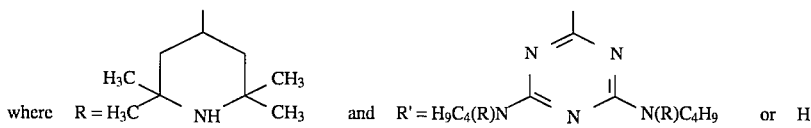

Of these classes, classes c) and f) are particularly suitable, in particular the tetraalkylpiperidine compounds containing s-triazine groups. Compounds 74, 76, 84, 87, 92 and 95 are furthermore particularly suitable.

The amount of sterically hindered amine, preferably the tetramethylpiperidine compound, depends on the intended use of the plastic additive granules; the granules expediently comprise 0–90% by weight, preferably 20–70% by weight, of sterically hindered amine.

The antioxidants of the sterically hindered phenol type are generally known as antioxidants for organic materials and are frequently used for the stabilization of polymers. These compounds preferably contain at least one group of the formula (X)

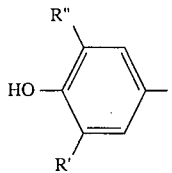

in which R' is hydrogen, methyl or tert-butyl; and R" is unsubstituted or substituted alkyl or substituted alkylthioalkyl.

Particular preference is given to compounds containing at least one group of the formula

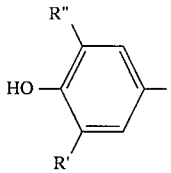

in which R' is methyl or tert-butyl and R" is unsubstituted or substituted alkyl or substituted alkylthioalkyl.

Examples of such phenol antioxidants are:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methyl-undec-1'-yl)-phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3. Hydroquinones and alkylated hydroquinones, for example 2,6-di-tert-butyl-4methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

6. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris-(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

7. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di-[4-(1,1,3,3tetramethylbutyl)phenyl]2,2-bis(3,5-di-tert-butyl-4-hydroxybenzyl)malonate.

9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tert-butyl-4-hydroxybenzyl)phenol.

10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tertbutyl-4-hydroxybenzylphosphonate, dioctadecyl 5-tert-butyl-4-hydroxy-3-methylbenzylphosphonate, calcium salt of monoethyl 3,5-di-tert-butyl-4-hydroxybenzyl phosphonate.

12. Acylaminophenols, for example 4-hydroxylauranilide, 4-hydroxystearanilide, octyl N-(3,5-di-tert-butyl-4-hydroxyphenyl)carbamate.

13. Esters of β-(3,5-di-tert-butyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

14. Esters of β-(5-tert-butyl-4-hydroxy-3-methylphenyl) propionic acid, with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

15. Esters of β-(3,5-dicyclohexyl-4-hydroxyphenyl)propionic acid, with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

16. Esters of 3,5-di-tert-butyl-4-hydroxyphenylacetic acid, with monohydric or polyhydric alcohols, for example methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

17. Amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Preference is given to the antioxidants mentioned above under points 7, 9, 10, 13, 14, 15 and 17, in particular points 7, 9, 10 and 13; especially the octanol and octadecanol ester of β-(3,5-di-tert-butyl-4-hydroxyphenyl)propionic acid and tetrakis[3-(3,5-di-tert-butyl-4-hydroxyphenyl)propionyloxymethyl]methane. Most preference is given to tetrakis [3-(3,5-di-tert-butyl-4-hydroxyphenyl)propionyloxymethyl] methane.

Other particularly preferred compounds are:

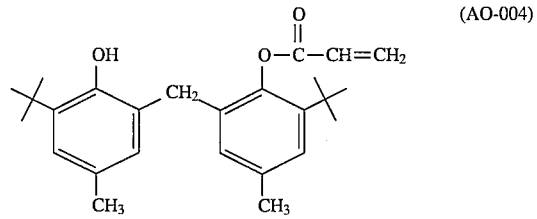

(AO-004)

{2-(1,1-dimethylethyl)-6-[[3-(1,1-dimethylethyl)-2-hydroxy-methylphenyl]methyl]-4-methylphenyl 2-propenoate};

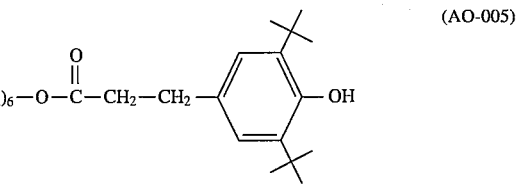

(AO-005)

{1,6-hexanediyl 3,5-bis(1,1-dimethylethyl)-4-hydroxyphenylpropanoate};

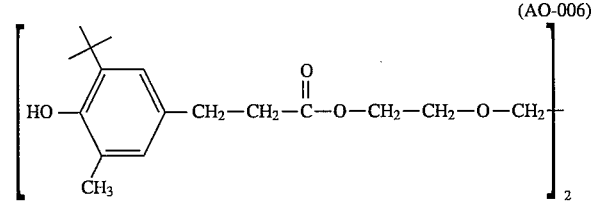

(AO-006)

{1,2-ethanediylbis(oxy-2,1-ethanediyl) 3-(1,1-dimethylethyl)-4-hydroxy-5-methyl-phenylpropanoate};

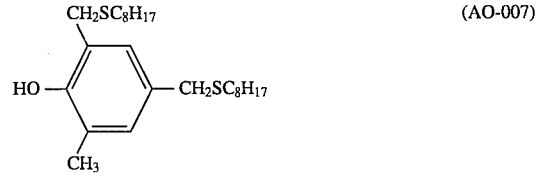

(AO-007)

{2-methyl-4,6-di[(octylthio)methyl]phenol};

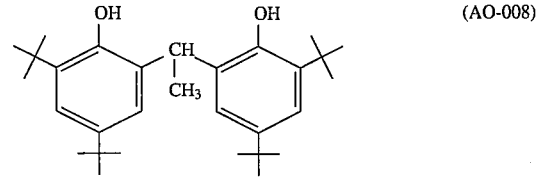

(AO-008)

{2,2'-ethylidenebis(4,6-di-tert-butylphenol)};

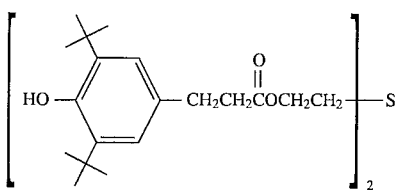
(AO-009)

{thiodi-2,1-ethanediyl bis-3,5-di(1,1-dimethylethyl)-4-hydroxyphenylpropanoate};

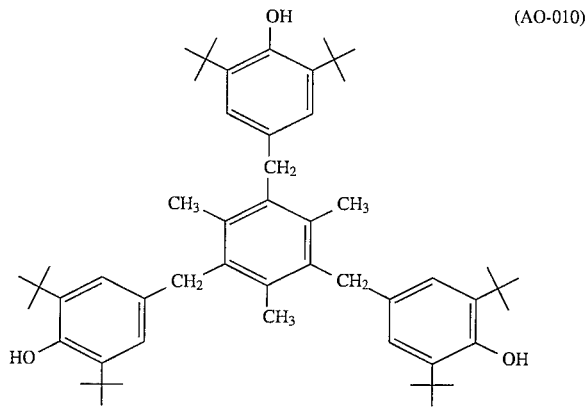
(AO-010)

{4,4',4"-[(2,4,6-trimethyl-1,3,5-phenyltriyl)tris(methylene)]tris[2,6-bis(1,1-dimethylethyl)phenol]};

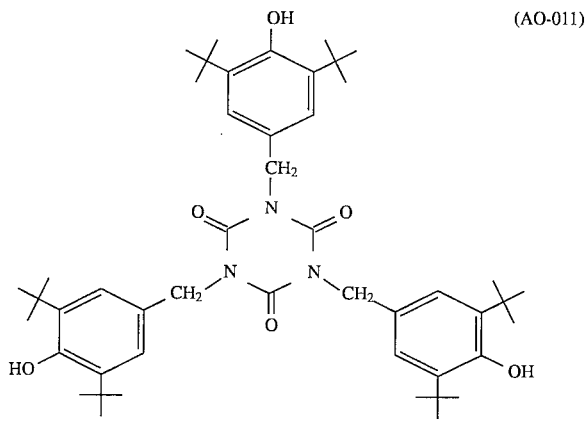
(AO-011)

{1,3,5-tris[[3,5-bis(1,1-dimethylethyl)-4-hydroxyphenyl]methyl]-1,3,5-triazine-2,4,6(1H,3H,5H)-trione}.

The amount of the antioxidants of the sterically hindered phenol type depends on the intended use of the plastic additive granules; the granules expediently contain 0–90% by weight, preferably 3–60% by weight, of antioxidant of the sterically hindered phenol type.

Organic phosphites and phosphonites are likewise known as stabilizers for plastics. They are used, in particular, as processing stabilizers for polyolefins.

They are predominantly aromatic phosphites and phosphonites, for example triphenyl phosphite, diphenyl alkyl phosphites, phenyl dialkyl phosphites, tris(diphenyl alkyl phosphite)amines, tris(nonylphenyl) phosphite, trilauryl phosphite, trioctadecyl phosphite, distearyl pentaerythrityl diphosphite, tris(2,4-di-tert-butylphenyl) phosphite, distearyl pentaerythrityl diphosphite, bis(2,4-di-tert-butylphenyl) pentaerythrityl diphosphite, tristearyl sorbityl triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5,5]undecane and 2,2'-ethylidenebis(4,6-di-tert-butylphenyl) fluorophosphite.

Particular preference is given to the following phosphites:
(P-001) tris(2,4-di-tert-butylphenyl) phosphite;

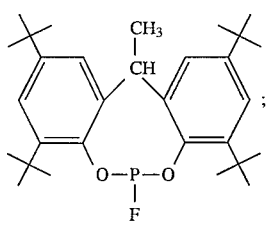
(P-002)

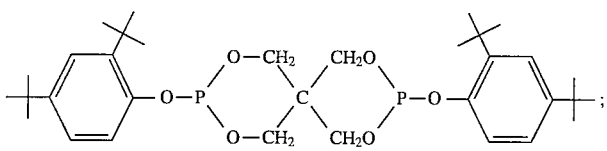
(P-003)

-continued

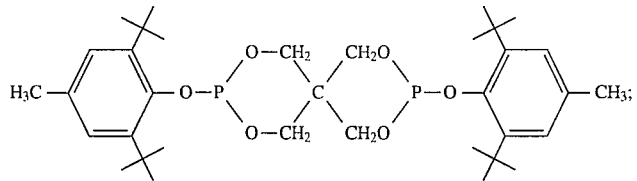
(P-004)

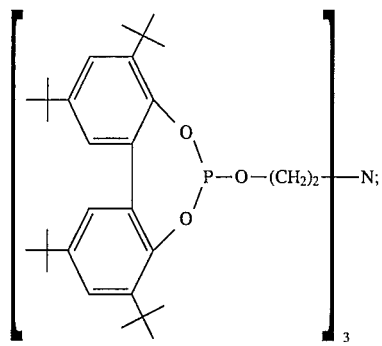
(P-005)

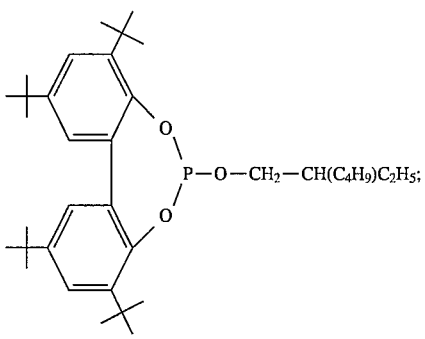
(P-006)

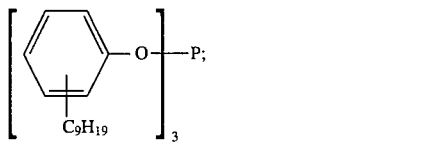
(P-007)

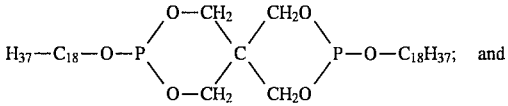
(P-008)

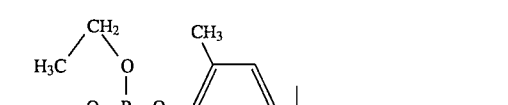
and

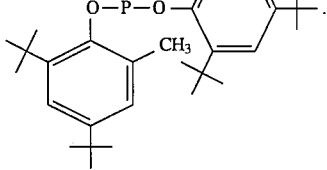
(P-009)

Very particular preference is given to tris(2,4-di-tert-butylphenyl) phosphite.

The amount of phosphites or phosphonites depends on the intended use of the plastic additive granules; the granules expediently contain 0–90% by weight, preferably 3–70% by weight, of phosphite or phosphonite.

Besides a sterically hindered phenol, the additive granules preferably also contain an organic phosphite or phosphonite. Preferred are combinations of a preferred sterically hindered phenol and a preferred organic phosphite or phosphonite, as indicated above; for example, the combination of the octanol or octadecanol of β-(3,5-di-tert-butyl-4-hydroxyphenyl)propionic acid or tetrakis[3-(3,5-di-ten-butyl-hydroxyphenyl- )propionyloxymethyl]methane with tris(2,4-di-tert-butylphenyl) phosphite. Most preferred is the combination of tetrakis[3-(3,5-di-tert-butyl-hydroxyphenyl)propionyloxymethyl]methane and tris(2,4-di-tert-butylphenyl) phosphite. The weight ratio between sterically hindered phenol and phosphite or phosphonite is preferably from 20:1 to 1:20, particularly preferably from 10:1 to 1:10, and very particularly preferably from 4:1 to 1:4.

Compounds from the series consisting of the hydrotalcites, metal carbonates and metal oxides which can be used according to the invention are both naturally occurring minerals and synthetic compounds.

Compounds from the hydrotalcite series can be represented by the general formula (X)

$$M^{2+}_{1-x}.M^{3+}_{x}.(OH)_2.(A^{n-})_{x/n}.mH_2O \qquad (X)$$

where $M^{2+}=Mg^{2+}$, $Ca^{2+}$, $Sr^{2+}$, $Ba^{2+}$, $Zn^{2+}$, $Cd^{2+}$, $Pb^{2+}$, $Sn^{2+}$ and/or $Ni^{2+}$, $M^{3+}=Al^{3+}$, $B^{3+}$ or $Bi^{3+}$, $A^{n-}$ is an anion having the valency n, n is a number from 1 to 4, x is a number from 0 to 0.5, and m is a number from 0 to 2.

$A^{n-}$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $$\begin{array}{c} COO^- \\ | \\ COO^- \end{array}, (CHOHCOO)_2^{2-},$$

$(CHOH)_4CH_2OHCOO^-$. $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$.

Other hydrotalcites which can expediently be employed in the process as described above are compounds of the general formula (Xa)

$$M_x^{2+}Al_2(OH)_{2x+6nz}(A^{n-})_2.mH_2O \qquad (Xa)$$

where, in the present formula Xa, $M^{2+}$ is at least one metal from the series consisting of Mg and Zn, preferably $Mg^{2+}$, $A^{n-}$ is an anion, for example from the series consisting of $$CO_3^{2-}, \left(\begin{array}{c} COO \\ | \\ COO \end{array}\right)^{2-},$$

$OH^-$ and $S^{2-}$, where n is the valency of the anion, m is a positive number, preferably from 0.5 to 5, and x and z are positive numbers, where x is preferably from 2 to 6 and z is less than 2.

Preferred and commercially available hydrotalcites are DHT-4A and DHT-4C from Kyowa company, Japan.

Preference is given to compounds from the hydrotalcite series of the general formula (X)

$$M^{2+}_{1-x}.M^{3+}_{x}.(OH)_2.(A^{n-})_{x/n}.mH_2O \qquad (X)$$

where $M^{2+}$ is $Mg^{2+}$ or a solid solution of Mg and Zn, $A^{n-}$ is $CO_3^{2-}$, x is a number from 0 to 0.5, and m is a number from 0 to 2.

Very particular preference is given to hydrotalcites of the formulae $Al_2O_3.6MgO.CO_2.12H_2O$, $Mg_{4.5}Al_2(OH)_{13}.CO_3.3,5H_2O$, $4MgO.Al_2O_3.CO_2.9H_2O$, $4MgO.Al_2O_3.CO_2.6H_2O$, $ZnO.3MgO.Al_2O_3.CO_2.8-9H_2O$ or $ZnO.3MgO.Al_2O_3.CO_2.5-6H_2O$.

The amount of hydrotalcites depends on the intended use of the plastic additive granules; the granules expediently contain 0–50% by weight, preferably 3–40% by weight, of hydrotalcite.

Preferred metal oxides are the oxides of divalent metals. Particular preference is given to the oxides of metals from the second main group or sub-group, very particular preference being given to zinc oxide and magnesium oxide.

The amount of metal oxides depends on the intended use of the plastic additive granules; the granules expediently contain 0–90% by weight, preferably 5–60% by weight, of metal oxide.

Preferred metal carbonates are the carbonates of divalent metals. Particular preference is given to the carbonates of metals from the second main group or sub-group, very particular preference being given to calcium carbonate.

The amount of metal carbonates depends on the intended use of the plastic additive granules; the granules expediently contain 0–90% by weight, preferably 5–60% by weight, of metal carbonate.

A further metal soap for the purposes of this invention is a metal salt of a fatty acid (with the exception of calcium stearate), where the metal can be, in particular, an element from main group or sub-group II or tin.

These are in particular magnesium, tin or preferably zinc salts from the series consisting of aliphatic saturated $C_2$–$C_{22}$carboxylates, aliphatic olefinic $C_3$–$C_{22}$carboxylates, aliphatic $C_2$–$C_{22}$carboxylates substituted by at least one OH group, cyclic or bicyclic $C_5$–$C_{22}$carboxylates, aromatic $C_7$–$C_{22}$carboxylates, aromatic $C_7$–$C_{22}$carboxylates substituted by at least one OH group, $C_1$–$C_{16}$alkyl-substituted phenylcarboxylates and phenyl-$C_1$–$C_{16}$alkylcarboxylates, preference being given to stearates and laurates and behenates. The other metal soaps are very particularly preferably zinc stearate or magnesium stearate.

The amount of the other metal soap depends on the intended use of the plastic additive granules; the granules expediently contain 0–90% by weight, preferably 5–60% by weight, of a further metal soap.

Preferred thioesters are esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis(β-dodecylmercapto)propionate or ethylene glycol bismercaptoacetate.

Examples of suitable lubricants are: montan wax, fatty acid esters, PE waxes, amide waxes, chlorinated paraffins, glycerol esters or alkaline earth metal soaps. Suitable lubricants are also described in "Plastics Additives", editors H. Gächter and H. Müller, Hanser Verlag, 3rd Edition, 1990, pages 423–480.

The additive granules can furthermore contain compounds from classes 2–10 below:

2. UV absorbers and light stabilizers 2.1. 2-(2'-Hydroxyphenyl)benzotriazoles, for example 2-(2'-hydroxy-5'-methylphenyl)benzotriazole, 2-(3',5'-ditert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-yl phenol]; transesterification product of 2-[3'-tert-butyl-5'-(2-methoxycarbonylethyl)-2'-hydroxyphenyl] benzotriazole with polyethylene glycol 300; [R—CH$_2$CH$_2$—COO(CH$_2$)$_3$]$_2$ where R=3'-tert-butyl-4'-hydroxy-5'-2H-benzotriazol-2-yl phenyl.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

2.6. Oxalamides, for example 4,4'-dioctyloxyoxanilide, 2,2'diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

2.7. 2-(2-Hydroxyphenyl)-1,3,5-triazines for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine.

3. Metal deactivators, for example N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalodihydrazide, oxanilide, isophthalodihydrazide, sebacobisphenyl hydrazide, N,N'-diacetyladipodihydrazide, N,N'-bissalicyloyloxalodihydrazide and N,N'-bissalicyloylthiopropionodihydrazide.

4. Peroxide scavengers, for example esters of β-thiodipropionic acid, for example the lauryl, stearyl, myristyl and tridecyl esters, mercaptobenzimidazole, the zinc salt of 2-mercaptobenzimidazole, zinc dibutyldithiocarbamate, dioctadecyl disulfide and pentaerythrityl tetrakis(β-dodecylmercapto)propionate.

5. Polyamide stabilizers, for example copper salts in combination with iodides and/or phosphorus compounds and salts of divalent manganese.

6. Basic costabilizers, for example melamine, polyvinylpyrrolidone, dicyandiamide, triallyl cyanurate, urea derivatives, hydrazine derivatives, amines, polyamides, polyurethanes, alkali and alkaline earth metal salts of higher fatty acids, for example zinc stearate, magnesium behenate, magnesium stearate, sodium ricinoleate, potassium palmitate, antimony pyrocatecholate and tin pyrocatecholate.

7. Nucleating agents, for example 4-tert-butylbenzoic acid, adipic acid and diphenylacetic acid.

8. Fillers and reinforcing agents, for example calcium carbonate, silicates, glass fibres, asbestos, talc, kaolin, mica, barium sulfate, metal oxides and hydroxides, carbon black and graphite.

9. Other additives, for example plasticizers, lubricants, emulsifiers, pigments, optical brighteners, flameproofing agents, antistatic and blowing agents.

10. Benzofuranones and indolinones, as described, for example, in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy- 3,5-dimethylphenyl)-5,7-di-tert-butylbenzofuran-2-one and 3-(3,5-dimethyl-4-pivaloyloxyphenyl)-5,7-di-tert-butylbenzofuran-2-one.

The granules according to the invention are suitable for the stabilization of organic polymers or plastics against thermal, oxidative or photoinduced degradation. Examples of such polymers are, but not limited to:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene; furthermore polyethylene (which can be crosslinked), for example high density polyethylene (HDPE), low density polyethylene (LDPE), linear low density polyethylene (LLDPE) and branched low density polyethylene (BLDPE).

Polyolefins, ic. polymers of monoolefins, as mentioned by way of example in the previous paragraph, in particular polyethylene and polypropylene, can be prepared by various processes, in particular by the following methods:

a) by means of free radicals (usually at high pressure and high temperature).

b) by means of a catalyst, where the catalyst usually contains one or more metals from group IVb, Vb, VIb or VIII. These metals usually contain one or more ligands, such as oxides, halides, alkoxides, esters, ethers, amines, alkyls, alkenyls and/or aryls, which can be either $\pi$- or $\sigma$-coordinated. These metal complexes can be free or fixed to supports, for example to activated magnesium chloride, titanium(III) chloride, aluminum oxide or silicon oxide. These catalysts can be soluble or insoluble in the polymerization medium. The catalysts can be active as such in the polymerization or further activators can be used, for example metal alkyls, metal hydrides, metal alkyl halides, metal alkyl oxides or metal alkyl oxanes, where the metals are elements from groups Ia, IIa and/or IIIa. The activators can have been modified, for example, by means of further ester, ether, amine or silyl ether groups. These catalyst systems are usually known as Phillips, Standard Oil Indiana, Ziegler(-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and its mixtures with low density polyethylene (LDPE), propylene-but-1-ene, propylene-isobutylene, ethylene-but-1-ene, ethylene-hexene, ethylene-methylpentene, ethylene-heptene, ethylene-octene, propylene-butadiene, isobutylene-isoprene, ethylene-alkyl acrylate, ethylene-alkyl methacrylate, ethylene-vinyl acetate copolymers or copolymers thereof with carbon monoxide or ethylene-acrylic acid copolymers and their salts (ionomers) and terpolymers of ethylene with propylene and a diene, such as hexadiene, dicyclopentadiene or ethylidenenorbornene; as well as mixtures of such copolymers and their mixtures with polymers mentioned in 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and polyalkylene-carbon monoxide copolymers with an alternating or random structure, and mixtures thereof with other polymers, for example polyamides.

4. Hydrocarbon resins (for example $C_5$–$C_9$), including hydrogenated modifications thereof (for example tackifing resins) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene-butadiene, styrene-acrylonitrile, styrene-alkyl methacrylate, styrene-butadiene-alkyl acrylate, styrene-maleic anhydride, styrene-acrylonitrile-methyl acrylate; high impact strength mixtures of styrene copolymers and another polymer, for example a polyacrylate, a diene polymer or an ethylene-propylene-diene terpolymer; and block copolymers of styrene, for example styrene-butadiene-styrene, styrene-isoprenestyrene, styrene-ethylene/butylene-styrene or styrene-ethylene/propylene-styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for instance the copolymer mixtures known as ABS, MBS, ASA or AES polymers.

8. Halogen-containing polymers, such as polychloroprene, chlorinated rubber, chlorinated or chlorosulfonated polyethylene, copolymers of ethylene and chlorinated ethylene, epichlorohydrin homo- and copolymers, in particular polymers from halogen-containing vinyl compounds, for example polyvinyl chloride, polyvinylidene chloride, polyvinyl fluoride, polyvinylidene fluoride, as well as copolymers thereof, for example vinyl chloride-vinylidene chloride, vinyl chloride-vinyl acetate or vinylidene chloride-vinyl acetate.

9. Polymers derived from $\alpha,\beta$-unsaturated acids and derivatives thereof, such as polyacrylates and polymethacrylates, polymethacrylates, polyacrylamides and polyacrylonitriles which have been impact modified by means of butyl acrylate.

10. Copolymers of the monomers mentioned under 9) with each other or with other unsaturated monomers, for instance acrylonitrile-butadiene, acrylonitrile-alkyl acrylate, acrylonitrile-alkoxyalkyl acrylate or acrylonitrile-vinyl halide copolymers or acrylonitrile-alkyl methacrylate-butadiene terpolymers.

11. Polymers derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; and their copolymers with olefins mentioned in point 1).

12. Homopolymers and copolymers of cyclic ethers, such as polyalkylene glycols, polyethylene oxide, polypropylene oxide or copolymers thereof with bisglycidyl ethers.

13. Polyacetals, such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from polyethers, polyesters or polybutadienes with terminal hydroxyl groups on the one hand and aliphatic or aromatic polyisocyanates on the other, and precursors thereof.

16. Polyamides and copolyamides derived from diamines and dicarboxylic acids and/or from aminocarboxylic acids or the corresponding lactams, such as nylon 4, nylon 6, nylon 6/6, 6/10, 6/9, 6/12, 4/6, and 12/12, nylon 11, nylon 12, aromatic polyamides obtained from m-xylene, diamine and adipic acid; polyamides prepared from hexamethylenediamine and isophthalic and/or terephthalic acid and optionally an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, for instance with polyethylene glycol, polypropylene glycol or polytetramethylene glycol. Further, EPDM- or ABS-modified polyamides or copolyamides; and polyamides condensed during processing ("RIM polyamide systems").

17. Polyureas, polyimides, polyamide-imides and polybenzimidazoles.

18. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate and polyhydroxybenzoates as well as block polyether-esters derived from polyethers having hydroxyl end groups; also polycarbonate- or MBS-modified polyesters.

19. Polycarbonates and polyester carbonates.

20. Polysulfones, polyether sulfones and polyether ketones.

21. Crosslinked polymers derived from aldehydes on the one hand and phenols, urea or melamine on the other, such as phenol-formaldehyde resins, urea-formaldehyde resins and melamine-formaldehyde resins.

22. Drying and non-drying alkyd resins.

23. Unsaturated polyester resins derived from copolyesters of saturated and unsaturated dicarboxylic acids with polyhydric alcohols, and vinyl compounds as crosslinking agents, and also halogen-containing modifications thereof of low inflammability.

24. Crosslinkable acrylic resins, derived from substituted acrylic esters, for example epoxy acrylates, urethane acrylates or polyester acrylates.

25. Alkyd resins, polyester resins or acrylate resins crosslinked with melamine resins, urea resins, polyisocyanates or epoxy resins.

26. Crosslinked epoxy resins derived from polyepoxides, for example from bisglycidyl ethers or from cycloaliphatic diepoxides.

27. Natural polymers, such as cellulose, natural rubber, gelatin and derivatives thereof which are chemically modified in a polymer-homologous manner, such as cellulose acetates, cellulose propionates and cellulose butyrates, or cellulose ethers, such as methylcellulose; and colophony resins and derivatives.

28. Mixtures (polyblends) of polymers as mentioned above, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

29. Natural and synthetic organic substances which are pure monomeric compounds or mixtures thereof, for example mineral oils, animal or vegetable fats, oils and waxes, or oils, waxes and fats based on synthetic esters (for example phthalates, adipates, phosphates or trimellitates), and blends of synthetic esters with mineral oils in any desired weight ratios, as used, for example, as spinning preparations, and aqueous emulsions thereof.

30. Aqueous emulsions of natural or synthetic rubbers, for example natural rubber latex or latexes of carboxylated styrene-butadiene copolymers.

The invention therefore furthermore relates to a composition comprising an organic polymer which is sensitive to thermal, oxidative or photoinduced degradation and the granules according to the invention. Surprisingly, the polymers stabilized by means of the granules according to the invention have higher stability than polymers stabilized by means of a conventional additive mixture. Polymers comprising the granules according to the instant invention may additionally comprise one or more conventional further plastics additives; preferably such additives are selected from the group consisting of sterically hindered amines (HALS), sterically hindered phenols, phosphites or phosphonites, hydrotalcites, metal oxides, metal carbonates, further metal soaps, antistatics, antiblocking agents, flameproofing agents, thioesters, internal and external lubricants, pigments, UV absorbers and further light stabilizers. The preferred compounds (and a detailed description) are as mentioned for the low-dust granules. The further plastics additive or additives may be in any convenient physical form, e.g. crystalline, powder, pellets, granules, dispersions or liquids. It is also possible that the polymer comprises more than one granulate according to the instant invention.

Preferred organic polymers are synthetic polymers and in particular the polymers from group 1, especially polyethylene and polypropylene.

The granules are expediently added to the organic polymers to be stabilized in amounts of from 0.01 to 10%, preferably from 0.01 to 5%, based on the total weight of the organic polymer to be stabilized.

The granules according to the invention and any further additives can be incorporated into the organic polymer by known methods, for example before or during molding or by applying the dissolved or dispersed granules to the polymer, if necessary with subsequent evaporation of the solvent. The granules can also be used for the production of so-called masterbatches.

The method for the stabilization of an organic polymer comprising incorporating into said polymer an effective stabilizing amount, as described above, of the low-dust granules is another object of the instant invention. The preferred embodiments for the low-dust granules and the polymer apply analogously.

The polymer stabilized in this way can be converted into a wide variety of forms in a conventional manner, for example into films, fibers, tapes, molding compositions or profiles.

The examples below illustrate the invention in greater detail and are not to be construed to limit the instant invention in any way. In these examples, as in the remainder of the description, parts are by weight and percentages are percent by weight, and "−+−" denotes a tert-butyl radical.

EXAMPLE 1

Calcium stearate powder (Radiastar® 1060; FINA, DE) is fed gravimetrically at a throughput of 20 kg/h by means of a metering unit to a twin-screw extruder (type DNDL44; Bühler, CH). The extruder is thermostated and has the following temperature profile: 18° C./18° C./200° C./200° C./230° C./230° C./230° C./175° C./175° C./175° C. The nozzle temperature is 180° C. The degassing (removal of the steam) takes place in the 5th zone. The product is extruded through 8 nozzles having a diameter of 2 mm at a screw speed of 135 rpm. Immediately after the nozzles, the extrudates in the plastic state (10,000 to 100,000 Pa.s) are cut and are subsequently cooled to 30° C. in a fluidized-bed condenser by means of air at 21° C.

The granules according to the invention used in this way have a rounded and quite regular shape and have very favorable bulk material properties (Table 1), in particular compared with the powder employed.

TABLE 1

|  | Granules | Powder |  |
|---|---|---|---|
| Particle size, shortest length[1] | >1 | <0.05 | [mm] |
| Particle size, longest length[1] | 2–6 | <0.1 | [mm] |
| Loose bulk density | 650 | 200 | [g/l] |
| Pour time (tR15)[2] | 6.6 | * | [s] |
| Water content[3] | 0.6 | 3.1 | [%] |
| Dust emission (5 min)[4] | 0.08 | >1 | [%] |
| Angle of repose[5] | 32 | 52 | [degree] |

[1]According to ISO 3435;
[2]According to DIN 53492;
[3]Determined by the Karl Fischer method;
[4]According to the Heubach test;
[5]According to ISO 4324;
*Not flowable

EXAMPLE 2

70 parts of calcium stearate powder (Radiastar® 1060; FINA, DE) and 30 parts of Irganox® 1076 (octadecyl ester of β-(3,5-di-tert-butyl-4-hydroxyphenyl)propionic acid; Ciba, CH) are homogeneously mixed in a Loedige mixer. The mixture is fed gravimetrically at a throughput of 100 kg/h by means of a metering unit to a twin-screw extruder (type DNDF93; Bühler, CH). The extruder is thermostated and has the following temperature profile: 21° C./205° C./205° C./205° C./80° C./80° C./30° C./15° C./15° C./15° C. The nozzle temperature is 180° C. The product is extruded through 30 nozzles having a diameter of 2 mm at a screw speed of 45 rpm. Immediately after the nozzles, the extrudates are cut in the plastic state and subsequently cooled to 30° C. in a fluidized-bed condenser using air at 21° C.

The granules according to the invention produced in this way have a rounded and fairly regular shape and have very favorable bulk-material properties (Table 2).

EXAMPLE 3

40 parts of calcium stearate powder (Radiastar® 1060; FINA, DE), 30 parts of Irganox® 1010 (pentaerythrityl ester of β-(3,5-di-tert-butyl-4-hydroxyphenyl)propionic acid; Ciba, CH) and 30 parts of Irgafos® 168 (tris-(2,4-di-tert-butylphenyl) phosphite; Ciba, CH) are homogeneously mixed in a Loedige mixer. The mixture is fed gravimetrically at a throughput of 100 kg/h by means of a metering unit to a twin-screw extruder (type DNDF93; Bühler, CH). The extruder is thermostated and has the following temperature profile: 21° C./240° C./240° C./240° C./220° C./220° C./200° C./15° C./15° C./15° C. The nozzle temperature is 150° C. The product is extruded through 8 nozzles having a diameter of 2 mm at a screw speed of 91 rpm. Immediately after the nozzles, the extrudates are cut in the plastic state and subsequently cooled to 30° C. in a fluidized-bed condenser using air at 21° C.

The granules according to the invention produced in this way have a rounded and fairly regular shape and have very favorable bulk-material properties (Table 2).

TABLE 2

|  | Granules | Powder |  |
|---|---|---|---|
| Particle size, shortest length[1] | >1 | >1 | [mm] |
| Particle size, longest length[1] | 2–4.5 | 2–5 | [mm] |

TABLE 2-continued

|  | Granules | Powder |  |
|---|---|---|---|
| Loose bulk density | 545 | 580 | [g/l] |
| Pour time (tR15)[2] | 9.9 | 8.5 | [s] |
| Water content[3] | 1.1 | 1.8 | [%] |
| Dust emission (5 min)[4] | 0.02 | 0.07 | [%] |
| Angle of repose[5] | 40 | 37 | [degree] |

[1]According to ISO 3435;
[2]According to DIN 53492;
[3]Determined by the Karl Fischer method and standardized to 100% calcium stearate;
[4]According to the Heubach test;
[5]According to ISO 4324;

EXAMPLE 4

1.5 g of Irganox® B 215 (1:2 mixture of pentaerythrityl ester of β-(3,5-di-tert-butyl-4-hydroxyphenyl)propionic acid and tris(2,4-di-tert-butylphenyl) phosphite; Ciba, CH) are mixed with 0.75 g of calcium stearate granules (prepared as described in Example 1) and 1500 g of polypropylene powder for 2 minutes in a water-cooled fluid mixer. A comparative mixture is prepared analogously, but this contains 0.75 g of pulverulent calcium stearate (Radiastar® 1060; FINA, DE).

The mixtures are each extruded 5 times in a 20d screw extruder at a maximum temperature of 260° C. After the first, third and fifth extrusions, the MFI value (230° C.; 2.15 kg; analogously to ISO 1133) is determined and in addition the yellowness index is determined after the fifth extrusion on press sheets with a thickness of 2 mm.

TABLE 3

| Mixture | MFI | | | YI |
|---|---|---|---|---|
|  | 1st | 3rd | 5th extrusion |  |
| Calcium stearate from Ex. 1 | 4.7 | 6.1 | 7.7 | 4.9 |
| Pulverulent calcium stearate | 5.0 | 6.6 | 8.5 | 5.7 |

The lower MFI and YI values clearly show that better stabilization is achieved using the calcium stearate granules according to the invention than using conventional pulverulent calcium stearate.

EXAMPLE 5

2.25 g of granules according to the invention extruded at 180° C. comprising 22.2 parts of Irganox® 1010 (pentaerythrityl ester of β-(3,5-di-tert-butyl-4-hydroxyphenyl)propionic acid; Ciba, CH), 44.5 parts of Irgafos® 168 (tris-(2,4-di-tert-butylphenyl) phosphite; Ciba, CH) and 33.3 parts of calcium stearate are mixed with 1500 g of polypropylene powder for 2 minutes in a water-cooled fluid mixer.

The mixture is extruded 5 times in a 20d screw extruder at a maximum temperature of 260° C. After the fifth extrusion, the yellowness index is determined on pressed sheets with a thickness of 2 mm. A YI value of 3.3 is obtained.

EXAMPLE 6

0.75 g of granules according to the invention extruded at 180° C. comprising 66.7 parts of Irganox® 1010 (pentaerythrityl ester of β-(3,5-di-tert-butyl-4-hydroxyphenyl)propionic acid; Ciba, CH) and 33.3 parts of calcium stearate and 1.5 g of granules according to the invention extruded at 180° C. comprising 66.7 parts of Irgafos® 168 (tris-(2,4-di-tert-butylphenyl) phosphite; Ciba, CH) and 33.3 parts of calcium stearate are mixed with 1500 g of polypropylene powder for 2 minutes in a water-cooled fluid mixer.

The mixture is extruded 5 times in a 20d screw extruder at a maximum temperature of 260° C. After the fifth extrusion, the yellowness index is determined on pressed sheets with a thickness of 2 mm. A YI value of 4.6 is obtained.

EXAMPLE 7

1.125 g of granules according to the invention extruded at 180° C. comprising 66.7 parts of Irganox® 1010 (pentaerythrityl ester of β-(3,5-di-tert-butyl-4-hydroxyphenyl) propionic acid; Ciba, CH) and 33.3 parts of calcium stearate and 1.125 g of granules according to the invention extruded at 180° C. comprising 66.7 parts of Irgafos® 168 (tris-(2, 4-di-tert-butylphenyl) phosphite; Ciba, CH) and 33.3 parts of calcium stearate are mixed with 1500 g of polypropylene powder for 2 minutes in a water-cooled fluid mixer.

The mixture is extruded 5 times in a 20d screw extruder at a maximum temperature of 260° C. After the fifth extrusion, the yellowness index is determined on pressed sheets with a thickness of 2 mm. A YI value of 4.8 is obtained.

EXAMPLE 8

1.5 g of Irganox® B 215 (1:2 mixture of pentaerythrityl ester of β-(3,5-di-tert-butyl-4-hydroxyphenyl)propionic acid and tris(2,4-di-tert-butylphenyl) phosphite; Ciba, CH; extruded in form of granules) are mixed with 0.75 g of calcium stearate granules (prepared as described in Example 1) and 1500 g of polypropylene powder for 2 minutes in a water-cooled fluid mixer.

The mixture is extruded 5 times in a 20d screw extruder at a maximum temperature of 260° C. After the fifth extrusion, the yellowness index is determined on pressed sheets with a thickness of 2 mm. A YI value of 4.7 is obtained.

What is claimed is:

1. A low-dust granule of plastic additives, comprising at least 10% by weight of calcium stearate, where the water content of the calcium stearate is less than 2%, having a particle size distribution, in accordance with ISO 3435, of from 1 mm to 10 mm, a loose bulk density of greater than 400 g/l and a flowability in accordance with DIN 53492 of less than 15 s (tR25).

2. A low-dust granule according to claim 1, comprising at least 20% by weight of calcium stearate.

3. A low-dust granule according to claim 2, comprising at least 30% by weight of calcium stearate.

4. A low-dust granule according to claim 3, comprising 100% calcium stearate.

5. A low-dust granule according to claim 1, having a particle size distribution in accordance with ISO 3435 of from 1 mm to 6 mm.

6. A low-dust granule according to claim 1, wherein the water content of the calcium stearate is less than 1%.

7. A low-dust granule according to claim 1, further comprising a compound selected from the group consisting of a sterically hindered amine, a sterically hindered phenol, a phosphite or phosphonite, a hydrotalcite, a metal oxide or carbonate, a further metal soap, an antistatic, an antiblocking agent, a flameproofing agent, a thioester, an internal and external lubricant, a pigment, a UV absorber and a further light stabilizer, or mixtures thereof.

8. A low-dust granule according to claim 1, further comprising a sterically hindered phenol and a phosphite or phosphonite.

9. A low dust granule according to claim 8, wherein the sterically hindered phenol is tetrakis-[3-(3,5-di-tert-butyl-4-hydroxyphenyl-propionyloxy-methyl]methane and the phosphite is tris(2,4-di-tert-butylphenyl) phosphite.

10. A low dust granule according to claim 8, wherein the weight ratio of tetrakis-[3-(3,5-di-tert-butyl-4-hydroxyphenyl-propionyloxy-methyl]methane to tris(2,4-di-tert-butylphenyl) phosphite is 20:1 to 1:20.

11. A low dust granule according to claim 10, wherein the weight ratio of tetrakis-[3-(3,5-di-tert-butyl-4-hydroxyphenyl-propionyloxy-methyl]methane to tris(2,4-di-tert-butylphenyl) phosphite is 10:1 to 1:10.

12. A low dust granule according to claim 11, wherein the weight ratio of tetrakis-[3-(3,5-di-tert-butyl-4-hydroxyphenyl-propionyloxy-methyl]methane to tris(2,4-di-tert-butylphenyl) phosphite is 4:1 to 1:4.

13. A low dust granule according to claim 1, comprising about 40 parts by weight of calcium stearate, about 30 parts by weight of tetrakis-[3-(3,5-di-tert-butyl-4-hydroxyphenyl-propionyloxy-methyl]methane and about 30 parts by weight of tris(2,4-di-tert-butylphenyl) phosphite.

14. A process for the production of a granule of one or more plastic additives, wherein said granule comprises at least 10% by weight of calcium stearate, wherein the water content of the calcium stearate is less than 2%, having a particle size distribution, in accordance with ISO 3435, of from 1 mm to 10 mm, a loose bulk density of greater than 400 g/l and a flowability in accordance with DIN 53492 of less than 15 s (tR25), said process comprising (a) warming a mixture of plastic additives comprising at least 10% and up to 100% by weight of calcium stearate until at least 80% by weight of the calcium stearate is melted;

(b) pressing the resultant melt through a plate provided with nozzles or holes, wherein the nozzle or hole diameter is from 1 to 10 mm; and (c) forming granules from the resultant extrudate while it is in the plastic state.

15. A process according to claim 14, wherein a peak temperature of said additive mixture of above 130° C. is achieved during the process.

16. A process according to claim 14, wherein a peak temperature of said additive mixture of above 150° C. is achieved during the process.

17. A process according to claim 14, further comprising degassing said melt.

18. A process according to claim 14, wherein said additives mixture comprises calcium stearate, a sterically hindered phenol and a phosphite or phosphonite.

19. A process according to claim 18, wherein said additives mixture comprises calcium stearate, tetrakis-[3-(3,5-di-tert-butyl-4-hydroxyphenyl-propionyloxymethyl]methane and tris(2,4-di-tert-butylphenyl) phosphite.

20. A process according to claim 19 wherein the weight ratio of tetrakis-[3-(3,5-di-tert-butyl-4-hydroxyphenyl-propionyloxy-methyl]methane to tris(2,4-di-tert-butylphenyl) phosphite is 20:1 to 1:20.

21. A process according to claim 20, wherein the weight ratio of tetrakis-[3-(3,5-di-tert-butyl-4-hydroxyphenyl-propionyloxy-methyl]methane to tris(2,4-di-tert-butylphenyl) phosphite is 10:1 to 1:10.

22. A process according to claim 21, wherein the weight ratio of tetrakis-[3-(3,5-di-tert-butyl-4-hydroxyphenyl-propionyloxy-methyl]methane to tris(2,4-di-tert-butylphenyl) phosphite is 4:1 to 1:4.

23. A process according to claim 14, wherein said additive mixture comprises about 40 parts by weight of calcium stearate, about 30 parts by weight of tetrakis-[3-(3,5-di-tert-butyl-4-hydroxyphenyl-propionyloxy-methyl]methane and about 30 parts by weight of tris(2,4-di-tert-butylphenyl) phosphite.

24. A method for the stabilization of an organic polymer comprising incorporating into said polymer an effective stabilizing amount of granules according to claim 1.

25. A method for the stabilization of an organic polymer comprising incorporating into said polymer an effective stabilizing amount of granules produced in accordance with the process of claim 14.

26. A composition comprising an organic polymer and an effective stabilizing amount of granules according to claim 1.

27. A composition according to claim 26, wherein the organic polymer is polyethylene or polypropylene.

28. A composition comprising an organic polymer and an effective stabilizing amount of granules produced by the process according to claim 14.

29. A composition according to claim 28, wherein the organic polymer is polyethylene or polypropylene.

* * * * *